United States Patent [19]
Ogata

[11] Patent Number: 5,834,734
[45] Date of Patent: Nov. 10, 1998

[54] HANDGRIP WITH BUILT-IN HEATER

[75] Inventor: Toru Ogata, Shizuoka, Japan

[73] Assignee: Koito Manufacturing Co., Ltd., Tokyo, Japan

[21] Appl. No.: 758,942

[22] Filed: Dec. 3, 1996

[30] Foreign Application Priority Data

Dec. 6, 1995 [JP] Japan .................................... 7-317813

[51] Int. Cl.⁶ .................................................. B60L 1/02
[52] U.S. Cl. .......................... 219/204; 219/541; 219/542
[58] Field of Search .................................. 219/204, 390, 219/238, 535, 547, 542, 546, 528, 541; 74/551.9, 558.5

[56] References Cited

U.S. PATENT DOCUMENTS 4,169,640 10/1979 Lee .
4,471,209 9/1984 Hollander ................................ 219/204

*Primary Examiner*—Teresa J. Walberg
*Assistant Examiner*—Vinod D Patel
*Attorney, Agent, or Firm*—Koda & Androlia

[57] ABSTRACT

A cylindrical rubber handgrip body to be connected to a handle bar pipe of, for example, a motor cycle, has a sheet-like heater embedded therein, and a power supply cord soldered to the heater and extending out of a side face of the grip body. The power supply cord extends inside the handgrip body along the circumference thereof over at least half a turn. A cord support of a high stiffness is provided in a cord exit portion of the handgrip body, for bearing the pulling force that acts on the power supply cord. Both the cord support and the handgrip body bear the pulling force that acts on the power supply cord and reduce the pulling force that is transmitted by the cord to the soldered connection to the heater.

12 Claims, 7 Drawing Sheets

HANDGRIP WITH BUILT-IN HEATER

BACKGROUND OF THE INVENTION

1. Field of the Invention

The present invention relates to a handgrip with a built-in heater and, more particularly, to a handgrip with a built-in heater for motor cycles.

2. Description of the Related Art

A conventional handgrip with a built-in heater as shown in FIG. 13 comprises a cylindrical rubber handgrip body 2A fitable to the handle bar pipe 1 of a motor cycle, a reinforcing plate 3 having a transverse sectional shape of an arc, and a sheet-like heater 4, such as an FPC heater. The reinforcing plate 3 and the heater 4 are integrally embedded in the handgrip body 2A. The sheet-like heater 4 is connected to a power supply cord 5 by a soldered connection 4a.

However, there is a danger that the power supply cord 5 may be disconnected at the soldered connection 4a from the sheet-like heater 4 when the cord 5 extending out from the handgrip body 2A is pulled by a hand or other external objects accidentally hitting the cord 5, or by turning the handgrip body for throttle operation in the case of the right-side handgrip whose handgrip body is connected to the throttle pipe.

Technologies for increasing the structural strength of the connection between the power supply cord and the sheet-like heater have been proposed. For example, as shown in FIG. 14, a ring 7 provided with cord clips 7a for clamping a cord 5 is embedded integrally in a handgrip body 2B so that the clamping of the cord 5 by the ring 7 (the clips 7a) prevents pulling forces from acting on the soldered connection 4a between the cord 5 and an FPC heater 4. FIG. 14 further shows a throttle pipe 8. In another technology (not shown), the end of a power supply cord is provided with a power supply end connector that is connected to a heater-end connector provided in the handgrip body.

However, although the aforementioned technologies ensure high strength of the connection between the sheet-like heater and the power supply cord, the provision of the ring 7 or the connector in the handgrip body complicates the construction of the handgrip, and increases the size of the cord exit portion of the handgrip body, interfering with the operation of switches or the like disposed next to the handgrip.

SUMMARY OF THE INVENTION

The present invention is intended to solve the above-stated problems of the conventional art. It is an object of the invention to provide a handgrip with a built-in heater that has a simple construction in which a power supply cord soldered to a sheet-like heater is led out sideways from the handgrip body, and that eliminates the danger of accidental disconnection at the soldered connection between the power cord and the sheet-like heater without increasing the size of the cord exit portion of the handgrip body.

To achieve the aforementioned objects, according to an aspect of the invention, there is provided a handgrip with a built-in heater comprising: a heater provided inside a handgrip body; a power supply cord that is connected for electrical connection to the heater and that extends out of the handgrip body; and means for damping pulling force that acts on the power supply cord, within a length of the power supply cord between a site where the power supply cord extends out of the handgrip body and a site where the power supply cord is connected for electrical connection to the heater.

In a preferred construction of the aforementioned pulling force damping means, the handgrip body has a generally circular sectional shape, and the power supply cord extends inside the handgrip body in a substantially circumferential direction, over at least a half turn, and then extends out of the handgrip body. The handgrip of the invention may be suitably connected to the handle bar pipe of a motor cycle.

As a more specific construction of the pulling force damping means, the handgrip with a built-in heater of the invention may comprise a heater-reinforcing inner piece fixed inside the handgrip body, the inner piece having a cord placement groove in which the power supply cord is disposed.

As another preferred construction of the pulling force damping means, the handgrip with a built-in heater may comprise a cord support disposed substantially at the site where the power supply cord extends out of the handgrip body, the cord support having a higher stiffness than the handgrip body and being capable of bearing pulling force that acts on the power supply cord. The cord support may be formed together with the inner piece. In addition, the cord support may extends substantially in the form of an arch across the cord placement groove, so that the power supply cord extends passing the cord support, and then extends out of the handgrip body.

According to another aspect of the invention, there is provided a handgrip with a built-in heater comprising: a heater disposed inside a handgrip body; a power supply cord that is electrically connected to the heater and that extends from the heater along a generally annular portion of the handgrip body and then extends out of the handgrip; and a cord support disposed substantially at the site where the power supply cord extends out of the handgrip body, the cord support having a higher stiffness than the handgrip body and being capable of bearing pulling force that acts on the power supply cord.

The handgrip body may be connected to a right hand-side handle bar pipe provided with throttle means, and the power supply cord may extend from the heater along the generally annular portion in the same direction as the direction in which the throttle means is turned.

According to the invention, since a considerable length of the power supply cord extending from the connections to the sheet-like heater is embedded within the handgrip body, preferably, with that length of the power supply cord turning through the cord placement groove over at least a half turn, the handgrip body becomes able to bear the forces that act on the power supply cord, reducing the pulling forces that act on the soldered connection to the heater.

In addition, the cord support of a high stiffness provided at the cord exit portion for bearing the forces that act on the power supply cord will also reduce the forces that act on the soldered connection to the heater.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
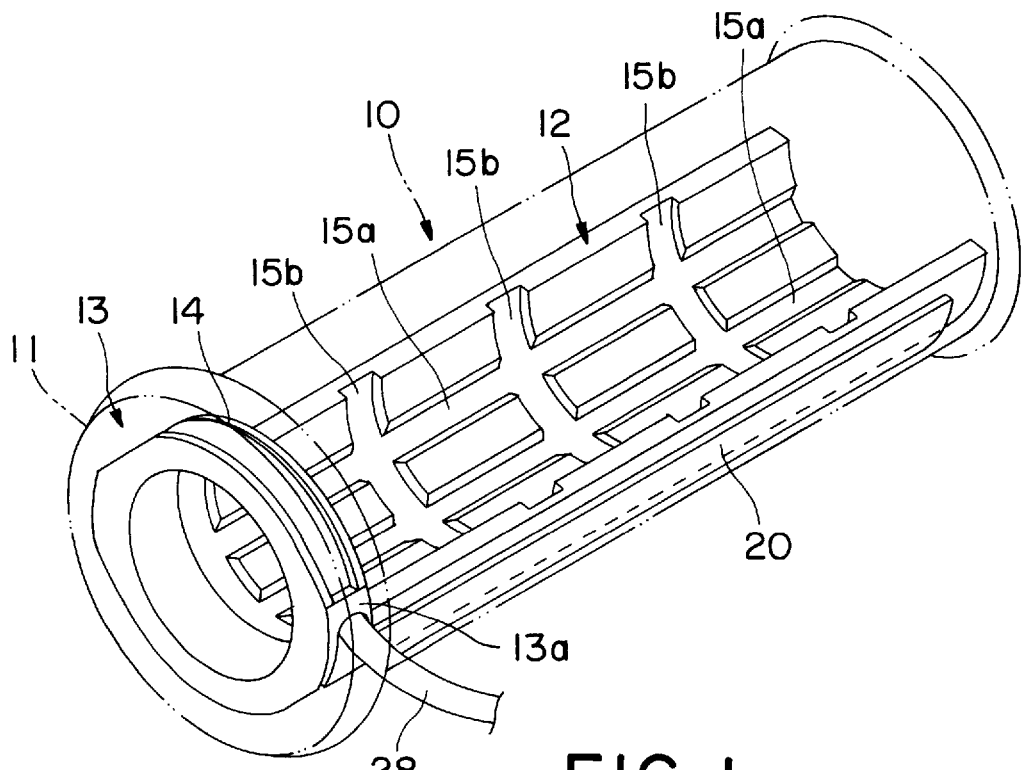
FIG. 1 is a perspective view of a right hand-side handgrip with a built-in heater according to a first embodiment of the present invention.

Preferred embodiments of the present invention will be described hereinafter with reference to the accompanying drawings.

A first embodiment of the present invention will be described with reference to FIGS. 1–7. A cylindrical handgrip body 10 whose exterior is formed of rubber is fitted over a throttle pipe 30 (see the cross sections shown in FIGS. 6, 7) rotatably connected to a handle bar pipe 40 of a motor cycle, thus forming a right-side handgrip. The handgrip body 10 comprises a semi-cylindrical inner piece 12 formed of a synthetic resin, a flexible printed-circuit board heater circuit (hereinafter, referred to as "FPC heater") 20 laid on an outer peripheral face of the semi-cylindrical inner piece 12, and a cover rubber layer 16 substantially forming the shape of the handgrip body 10. A portion of the cover rubber layer 16 is formed together with the FPC heater 20 so that the FPC heater 20 is sandwiched and extends between the cover rubber layer 16 and the inner piece 12. The cover rubber layer 16 has a flange at the inside end of the handgrip body 10.

Figure 2:
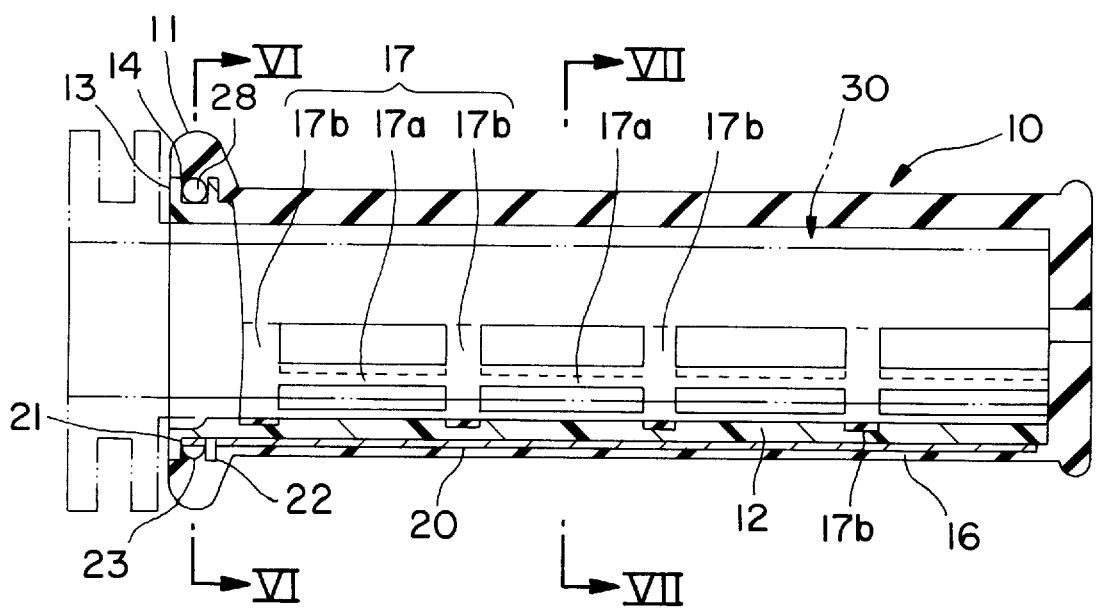
FIG. 2 is a longitudinal sectional view of the handgrip shown in FIG. 1.

The inner peripheral face of the inner piece 12 is provided with a rubber layer 17 for the press-fitting to the pipe. The rubber layer 17 is integrally connected to the cover rubber layer 16 and extends in a grip formation (made up of rubber layer bands 17a extending in the direction of the axis of the handgrip body 10, and rubber layer bands 17b extending in the circumferential direction) as shown in FIGS. 1, 2. More specifically, formed in the inner peripheral face of the inner piece 12 are shallow grooves 15a, 15b extending and connecting with each other in the form of a grid. The grooves 15a, 15b are filled with the rubber layer 17 (the rubber layer bands 17a, 17b) so that the rubber layer 17 is flush with the inner peripheral face of the inner piece 12. When the throttle pipe 30 is inserted into the handgrip body 10, the rubber layer 17 on the inner piece 12 is pressed against the throttle pipe 30, thus adding to the adhesion strength between the handgrip body 10 and the throttle pipe 30.

Figure 3:
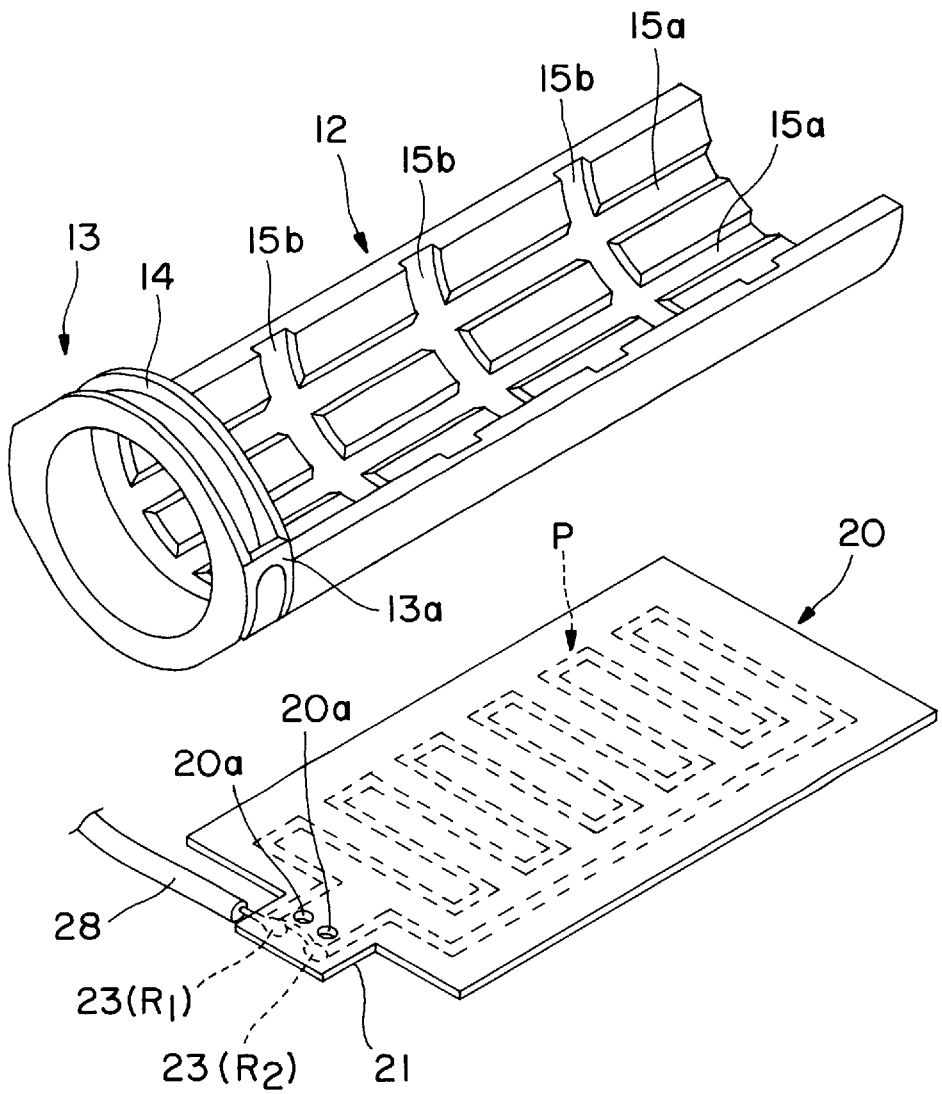
FIG. 3 is an exploded perspective view of an inner piece and an FPC heater provided in the handgrip.
Figure 4:
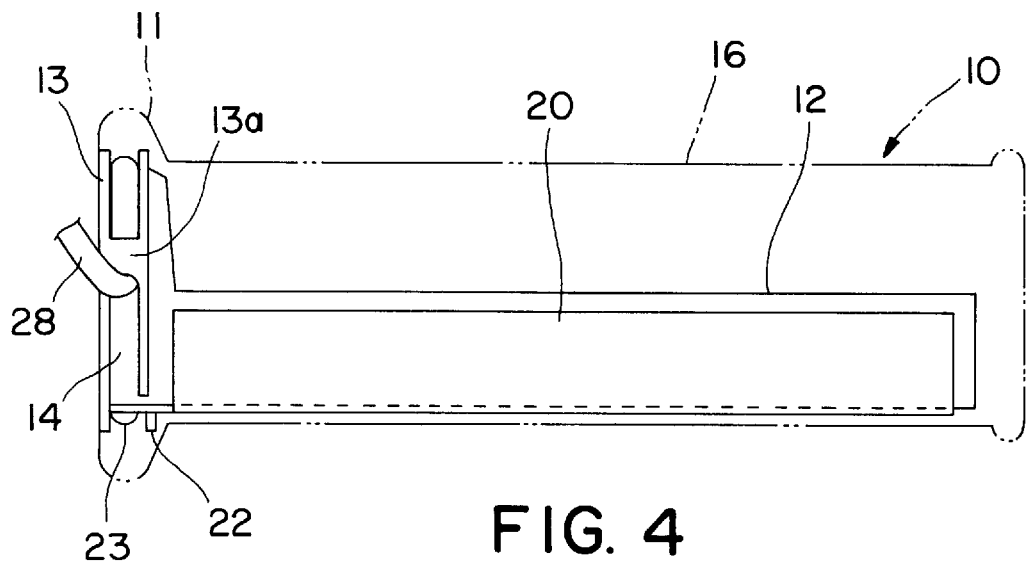
FIG. 4 is a side view of the handgrip, where a cover rubber layer is omitted.
Figure 5:
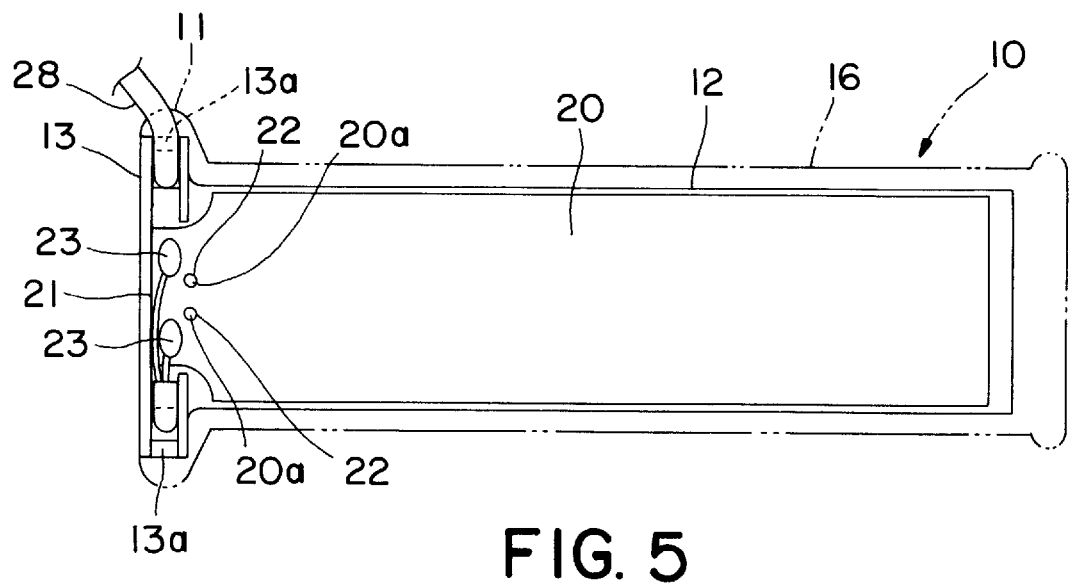
FIG. 5 is a bottom view of the handgrip, where the cover rubber layer is omitted.
Figure 6:
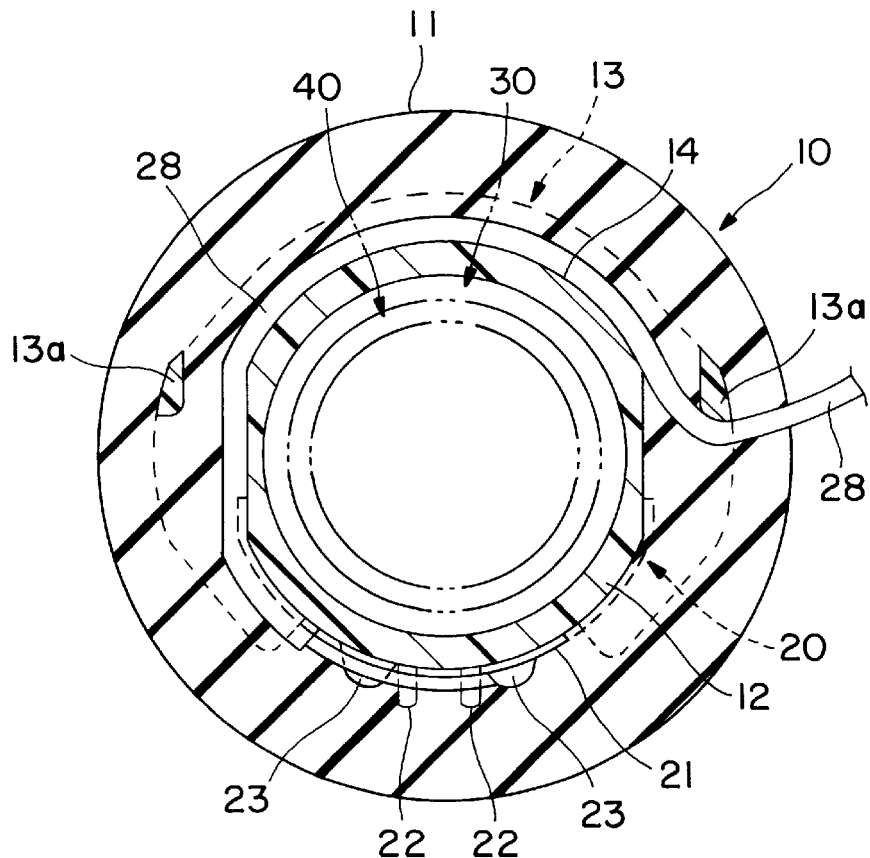
FIG. 6 is a transverse sectional view of the handgrip taken along line VI—VI of FIG. 2.
Figure 7:
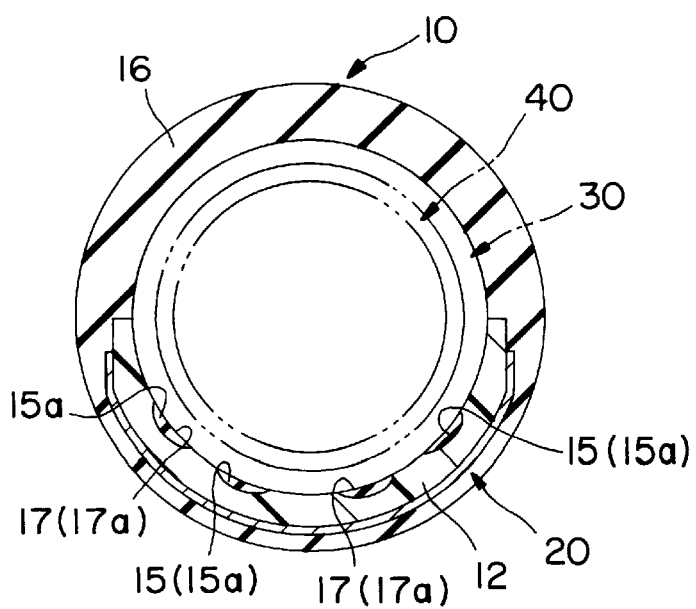
FIG. 7 is a transverse sectional view of the handgrip taken along line VII—VII of FIG. 2.

The FPC heater 20 sandwiched between the cover rubber layer 16 and the inner piece 12 has a sectional structure in which a copper foil strip pattern P serving as a heat source is laminated with a base film and an over film. When developed or laid flat, the FPC heater 20 assumes a substantially rectangular shape as shown in FIG. 3. A lead-out portion 21 for connection to a power source is formed on a length-end edge of the FPC heater 20. The lead-out portion 21 has two lands $R_1$, $R_2$ where copper foil pieces are exposed which connect to the copper foil pattern P extending substantially in a zigzag manner. Each land $R_1$, $R_2$ is connected by soldering to a power supply cord 28 connecting to a power source battery. The soldered connections are denoted by reference numeral 23. Two pins 22, 22 (see FIG. 5) are formed on the inner piece 12, in a position corresponding to the lead-out portion 21 of the FPC heater 20. By engaging the pins 22, 22 with holes 20a, 20a formed in the lead-out portion 21 of the FPC heater 20, the FPC heater 20 can be precisely positioned with respect to the inner piece 12.

Formed on the inside end of the inner piece 12 is a cylindrical collar 13 that has a cord placement groove 14 formed on its outer peripheral face. The power supply cord 28 soldered to the FPC heater 20 is laid in the groove 14, turning along the collar 13 until it passes under a cord support 13a formed integrally with the collar 13. Then the power supply cord 28 is led radially out of the collar 13.

Since the power supply cord 28, embedded inside the handgrip body 10, turns along the collar 13 of the inner piece 12 and then exits from the handgrip body 10, the cord course length between the soldered connections 23 and the cord exit portion of the handgrip body 10 is considerably increased, correspondingly increasing the force that acts on the length of the power supply cord 28 embedded in the handgrip body 10 to tightly retain the cord 28 to the handgrip body 10. More specifically, although the throttle operation of turning the handgrip body 10 causes a pulling force on the power supply cord 28 extending out of the handgrip body 10, this pulling force is withstood by the retaining force acting on the length of the power supply cord 28 embedded in the handgrip body 10 and, therefore, not transmitted to the soldered connections 23 to the FPC heater 20.

In addition, at the cord exit, the power supply cord 28 is substantially bent back over the cord support 13a, which is harder than rubber, that is, of a greater stiffness than rubber. Thereby, the pulling force acting on the power supply cord 28 is borne by the cord support 13a before being transmitted to the length of the cord 28 embedded in the handgrip body 10, so that a reduced pulling force is transmitted to the length of the cord 28 embedded in the handgrip body 10.

Figure 8:
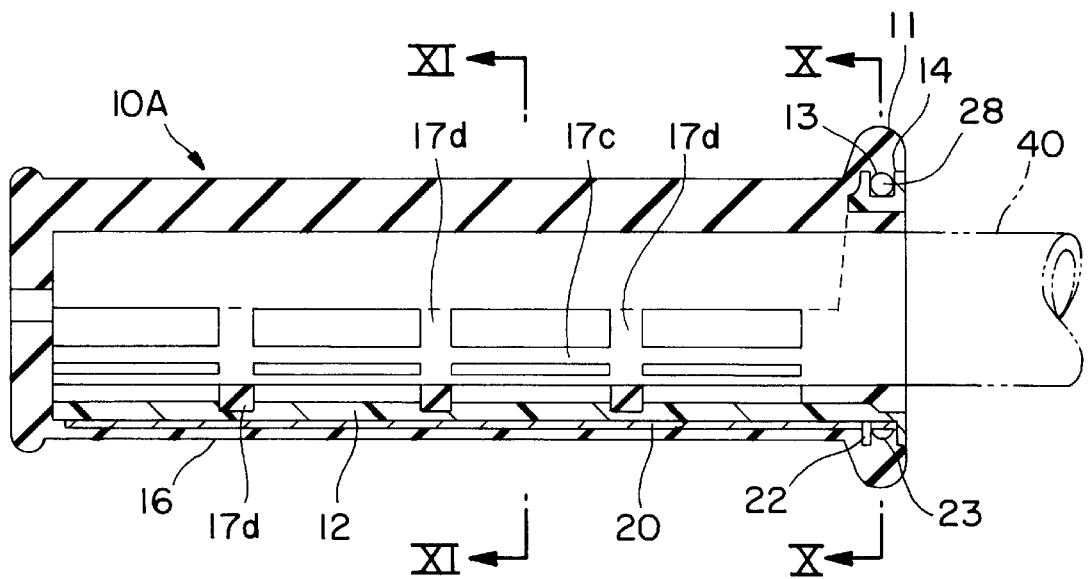
FIG. 8 is a longitudinal section of a left hand-side handgrip with a built-in heater according to a second embodiment of the present invention.
Figure 9:
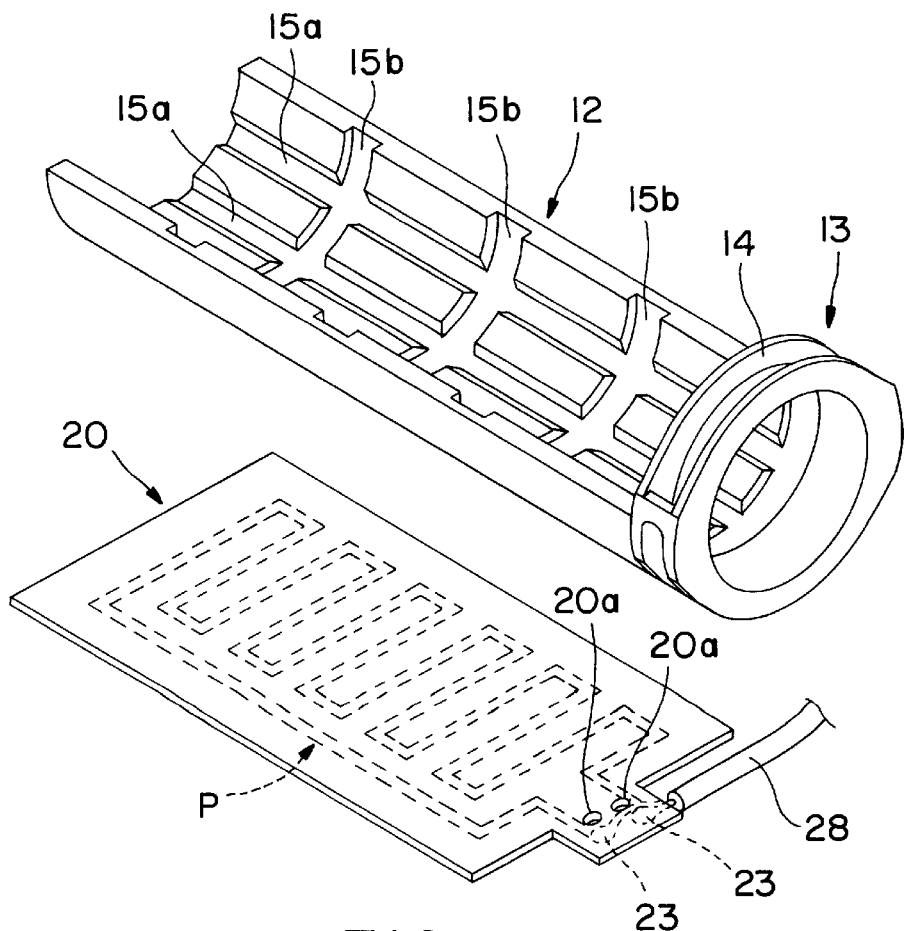
FIG. 9 is an exploded perspective view of an inner piece and an FPC heater provided in the handgrip.
Figure 10:
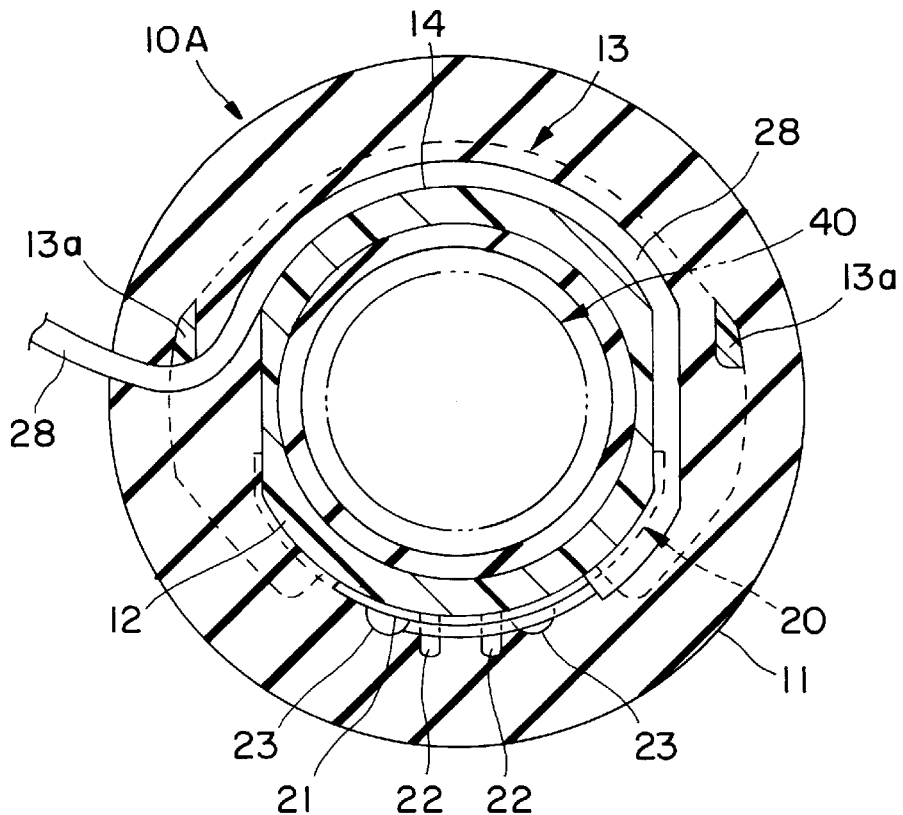
FIG. 10 is a transverse sectional view of the handgrip shown in FIG. 9, taken along line X—X of FIG. 8.
Figure 11:
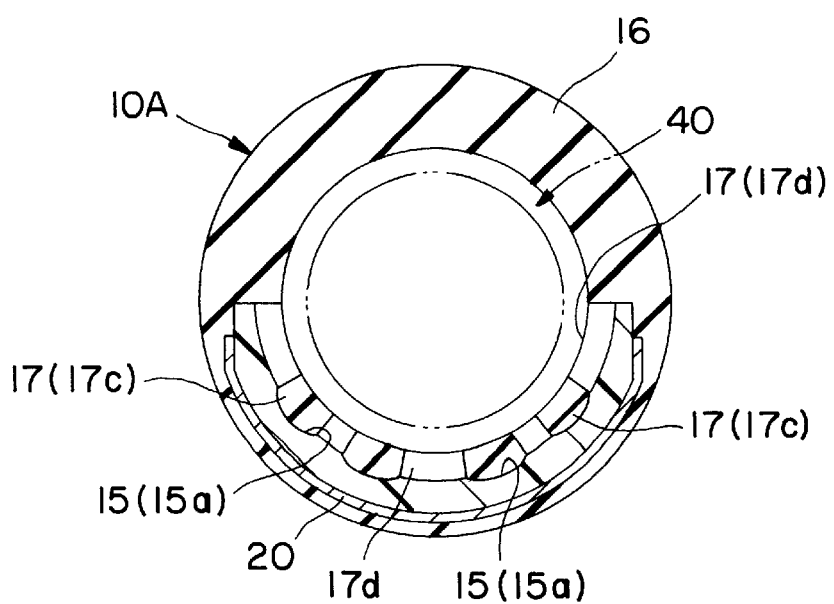
FIG. 11 is a transverse sectional view of the handgrip taken along line XI—XI of FIG. 8.

A second embodiment of the invention will be described with reference to FIGS. 8–11. FIG. 8 shows a longitudinal sectional view of a left-side handgrip with a built-in heater according to the second embodiment. FIG. 9 shows an exploded perspective view of an inner piece and an FPC heater constituting the left hand-side handgrip with a built-in heater. FIGS. 10, 11 are transverse sectional views of the handgrip taken along lines X—X, XI—XI of FIG. 8, respectively.

Referring to FIGS. 8–11, embedded in a cylindrical handgrip body 10A is an inner piece 12 exactly the same as that used in the right-side handgrip according to the first embodiment. The inner piece 12 is covered with a cover rubber layer 16. The amount of protrusion of a rubber layer 17 (17c, 17d) from the inner peripheral face of the inner piece 12, the rubber layer filling in grooves 15a, 15b formed in the inner peripheral face of the inner piece 12, and the inside diameter of the inner peripheral face of the cylindrical handgrip body 10A are determined such that the handgrip body 10A can be fitted over a handle bar pipe 40.

An FPC heater 20 of the left-side handgrip differs from that of the right-side handgrip in the direction of connection to a power supply cord 28 (see FIG. 9), but other constructions, such as the disposed position of the FPC heater or the cord exit position, are substantially the same as those of the right-side handgrip.

The other constructions or components of the handgrip body 10A are substantially the same as those of the first embodiment (right-side handgrip), and they are denoted by the same reference characters in the drawings and will not be described again.

Figure 12:
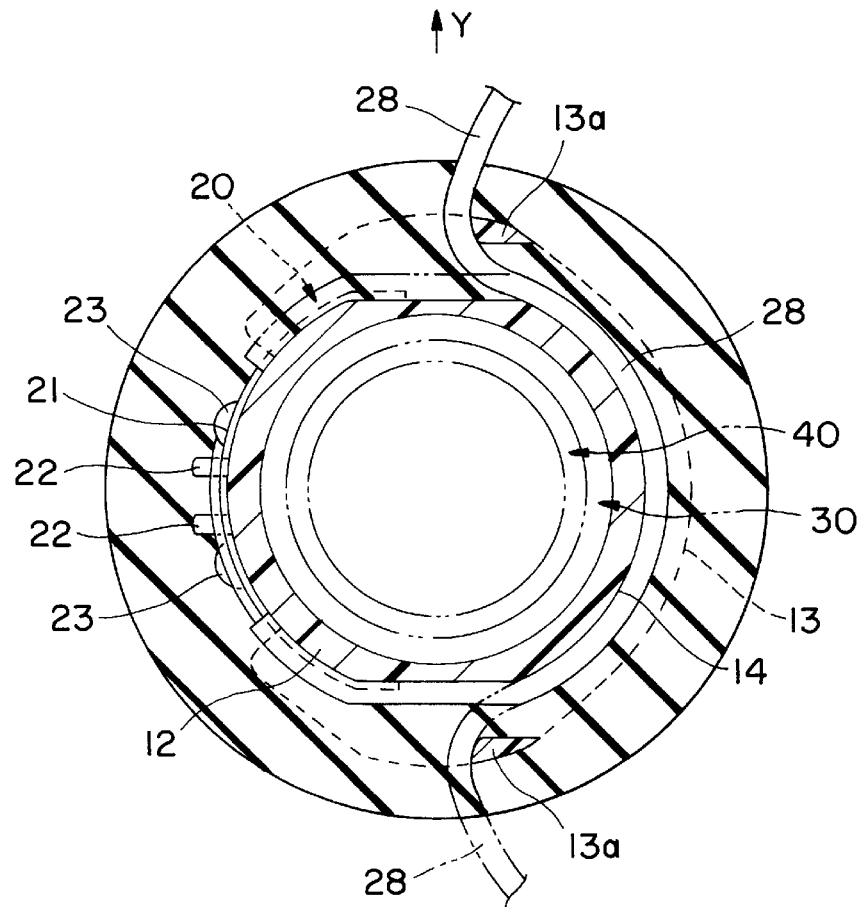
FIG. 12 is a transverse sectional view of a right hand-side heater-built-in handle grip according to a further embodiment of the invention (corresponding to FIG. 6)
Figure 13:
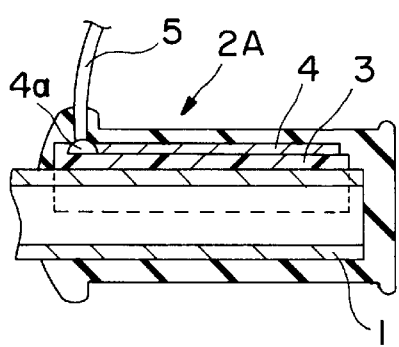
FIG. 13 is a longitudinal sectional view of a conventional handgrip with a built-in heater.
Figure 14:
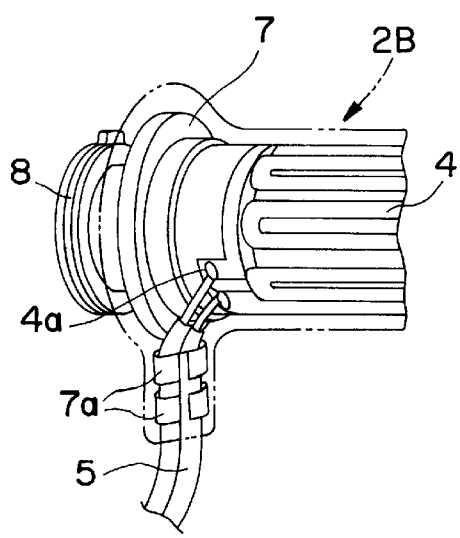
FIG. 14 is a perspective view of portions of another conventional handgrip with a built-in heater.

When the handgrip body according to the first and second embodiments is mounted on a handle bar pipe 40 as shown in FIG. 12, the power supply cord 28 extends out of the handgrip body, downward from the handle bar pipe 40 as indicated by the ghost lines. However, the power supply cord 28 may be led out upward from the handle bar pipe 40 as indicated by the solid lines in FIG. 12, by connecting the cord 28 to the FPC heater 20 in the direction opposite to the connecting direction according to the first or second embodiment. Thus, the power supply cord exit direction can be selected for individual vehicles.

Although the inner piece 12 reinforcing the FPC heater 20 has a semi-cylindrical shape and the side wall portion of the handgrip body 10 opposite the semi-cylindrical inner piece 12 is formed solely of the rubber layer according to the above embodiments, another semi-cylindrical inner piece may be disposed opposite to the semi-cylindrical inner piece 12 so that the two inner pieces form a cylindrical shape. If the FPC heater extends over substantially the entire circumference of the cylindrical inner piece assembly, the whole handgrip body can be uniformly heated.

Although the above embodiments have been described in conjunction with the FPC heater embedded in the handgrip body, the heater embedded in the handgrip body is not limited to the FPC heater. Other types of sheet-like heaters comprising nickel-base alloy wires and the like may also be employed.

As apparent from the above description, the handgrips according to the above embodiments ensure reliable connection between the power supply cord and the sheet-like heater by a simple construction where the length of the power supply cord embedded in the handgrip body turns around the handle bar pipe by at least a half turn and another simple construction where the cord support of a high stiffness is provided in the cord exit portion of the handgrip body, for bearing the pulling forces that act on the power supply cord. Thus the embodiments require no size increase of the cord exit portion and facilitate smooth operation of switches or the like disposed near the handgrip.

While the present invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. A handgrip with a built-in heater comprising:
   a heater provided inside a handgrip body, said handgrip body having a generally circular sectional shape;
   a power supply cord connected for electrical connection to the heater, the power supply cord extending inside the handgrip body in a substantially circumferential direction, over at least a half turn, and then extending out of the handgrip body; and
   means for damping pulling force that acts on the power supply cord, within a length of the power supply cord between a site where the power supply cord extends out of the handgrip body and a site where the power supply cord is connected for electrical connection to the heater.

2. A handgrip with a built-in heater according to claim 1, wherein the handgrip body has a generally circular sectional shape, and
   wherein the power supply cord extends inside the handgrip body in a substantially circumferential direction, over at least a half turn, and then extends out of the handgrip body.

3. A handgrip with a built-in heater according to claim 2, wherein the handgrip body is connected to a handle bar pipe of a motor cycle.

4. A handgrip with a built-in heater according to claim 1, further comprising a heater-reinforcing inner piece fixed inside the handgrip body, the inner piece having a cord placement groove in which the power supply cord is disposed.

5. A handgrip with a built-in heater according to claim 4, further comprising a cord support disposed substantially at the site where the power supply cord extends out of the handgrip body, the cord support having a higher stiffness than the handgrip body and being capable of bearing pulling force that acts on the power supply cord.

6. A handgrip with a built-in heater according to claim 5, wherein the cord support and the inner piece are formed together.

7. A handgrip with a built-in heater according to claim 6, wherein the cord support extends substantially in the form of an arch across the cord placement groove, so that the power supply cord extends passing the cord support, and then extends out of the handgrip body.

8. A handgrip with a built-in heater according to claim 1, further comprising a cord support disposed substantially at the site where the power supply cord extends out of the handgrip body, the cord support having a higher stiffness than the handgrip body and being capable of bearing pulling force that acts on the power supply cord.

9. A handgrip with a built-in heater comprising:
   a heater disposed inside a handgrip body;
   a power supply cord that is electrically connected to the heater and that extends from the heater along a generally annular portion of the handgrip body and then extends out of the handgrip; and
   a cord support disposed substantially at the site where the power supply cord extends out of the handgrip body, the cord support having a higher stiffness than the handgrip body and being capable of bearing pulling force that acts on the power supply cord.

10. A handgrip with a built-in heater according to claim 9, further comprising an inner piece fixed inside the handgrip body, for reinforcing the heater, the inner piece being formed together with the cord support.

11. A handgrip with a built-in heater according to claim 10, wherein the handgrip body is connected to a handle bar pipe of a motor cycle.

12. A handgrip with a built-in heater according to claim 11,
   wherein the handgrip body is connected to a right hand-side handle bar pipe provided with throttle means, and
   where the power supply cord extends from the heater along the generally annular portion in the same direction as the direction in which the throttle means is turned.

* * * * *